United States Patent [19]
Wietrzynski

[11] Patent Number: 5,824,350
[45] Date of Patent: Oct. 20, 1998

[54] DEVICE FOR MOLDING OR INJECTION-MOLDING POLYMER COMPOUNDS, AND MOLD ACCESSORIES

[75] Inventor: Bernhard Wietrzynski, Bad Friedrichshall, Germany

[73] Assignee: DME Normalien GmbH/Neuenstadt, Kocher, Germany

[21] Appl. No.: 737,087

[22] PCT Filed: Apr. 20, 1995

[86] PCT No.: PCT/DE95/00524

§ 371 Date: Feb. 7, 1997

§ 102(e) Date: Feb. 7, 1997

[87] PCT Pub. No.: WO95/29049

PCT Pub. Date: Nov. 2, 1995

[30] Foreign Application Priority Data

Apr. 26, 1994 [DE] Germany .......................... 94 06 940.9

[51] Int. Cl.$^6$ .................................................. B29C 45/40
[52] U.S. Cl. ........................ 425/190; 249/102; 249/103; 249/104; 425/192 R; 425/556
[58] Field of Search .................................. 249/102, 103, 249/104; 556/190, 192 R, 556

[56] References Cited

U.S. PATENT DOCUMENTS

| | | | |
|---|---|---|---|
| 4,137,962 | 2/1979 | Pol | 249/103 |
| 4,708,314 | 11/1987 | Kühling | 249/103 |
| 5,620,716 | 4/1997 | Opitz | 249/103 |

FOREIGN PATENT DOCUMENTS

| | | |
|---|---|---|
| 2644610 | 9/1990 | France . |
| 19 29 875 | 6/1971 | Germany . |
| 24 27 636 | 12/1975 | Germany . |
| 8526599 | 1/1986 | Germany . |
| 35 09 274 2 | 9/1986 | Germany . |
| 89 11 171.0 | 12/1989 | Germany . |
| 40 33 123 | 4/1991 | Germany . |
| 679 917 | 5/1992 | Switzerland . |

OTHER PUBLICATIONS

Kunststoffberater, vol. 28, No. 5, May 1983 Isernhagen De, p 14 'Für Auswerferstifte und Hülsen in Formen'.
Abstract: JP,A,60 193347; Oct. 1, 1985; Japan.
Abstract: JP,A,60 1555423; Aug. 15, 1985; Japan.
Abstract: JP,A,57 027736; Feb. 15, 1982; Japan.

Primary Examiner—Tim Heitbrink
Attorney, Agent, or Firm—Stephen H. Friskney

[57] ABSTRACT

A mold for molding or injection-molding polymer compounds, having at least one mold ancillary unit, in particular an ejector device (10), preferably an ejector pin, and/or a core pin device is distinguished by the fact that the mold ancillary device (10) has, at least over a region, a marker unit (18) in the region facing the polymer compound during the molding or injection-molding.

12 Claims, 2 Drawing Sheets

DEVICE FOR MOLDING OR INJECTION-MOLDING POLYMER COMPOUNDS, AND MOLD ACCESSORIES

BACKGROUND OF THE INVENTION

The present invention relates to a mold for molding or injection-molding polymer compounds, having at least one mold ancillary unit, in particular an ejector device, preferably an ejector pin, and/or a core pin device.

When molding or injection-molding polymer compounds, the individual moldings need to be identified. Thus, in the field of plastics, it must as a rule always be stated on the molding which plastic material is involved. Moreover, it is often desirable to be able to identify the time of production of the particular molding from the molding itself.

DESCRIPTION OF THE PRIOR ART

It is known, for the purpose of identifying moldings molded from polymer compounds, to incorporate a marker stamp in the wall of, for example, an injection mold, which marker stamp applies the marking to the surface of the molding in a structured manner. The marking may comprise information concerning the material or the date, for example.

FR-A-2.644.610 discloses an apparatus for automatically numbering injection moldings. In this apparatus, a groove-like marking is applied to the appropriate injection molding via a mold ancillary part. At the same time, a marking which has a fixed position may be arranged in the region next to the mold ancillary part.

Patent Abstracts of Japan, Vol. 10, No. 35 (E-380) [2092] discloses a tool, in which an injector pin is arranged, which has a stamp element, in order to impress a certain imprint on the molded article. A similar direction is taken by the publication Patent Abstracts of Japan, Vol. 9, No. 322 (M-440) [2045], which specifies an apparatus for molding polymer compounds which has an injector pin in the end region of which facing the polymer compound during the molding, a stamp is present which has letters, numbers or symbols.

SUMMARY OF THE INVENTION

The technical problem or the object on which the invention is based is furthermore to specify a mold ancillary device, specifically an ejector device or core pin device, for a mold for molding or injection-molding polymer compounds, which mold can be widely used, can be adapted to the particular installation configuration and ensures reliable marking.

The device according to the invention for a mold for molding or injection-molding polymer compounds is accordingly distinguished by the fact that marker unit can be fastened detachably to the mold ancillary device.

A particularly advantageous refinement is distinguished by the fact that the marker unit is designed as a date stamp. The same possibilities are provided with respect to the adjustment as in the known, separate date stamps.

It has proven beneficial to design the marker unit to be displaceable counter to the action of an elastic element, preferably a spring element.

A particularly preferred refinement is distinguished by the fact that the ejector device is designed as an ejector pin.

In a preferred refinement of the mold ancillary device according to the invention, the latter is present as an ejector pin having a first end region facing the polymer compound [lacuna] in the installed state and a second end region arranged opposite to the first end region, the first end region having the marker unit. As has already been described above, the marker unit may be designed as a date stamp, for example.

A particularly preferred refinement of the ejector device or core pin device according to the invention, which may also be used without a marker unit, is distinguished by the fact that a top plate can be fastened to the second end region with the aid of fastening means, the length of the receiving structure for the fastening means being selected to be greater than is required to ensure sufficient fastening. As a result of providing for a relatively great length of the receiving structure, it is no longer necessary, for different lengths, to provide ejector pins of different lengths. In fact, a sufficiently great length which will cover the common cases is selected, and an ejector pin of this kind is produced. If a relatively short ejector pin is required for installation, part of the ejector pin is simply cut off, while the still remaining receiving structure for the fastening means still has a great enough length for fastening the top plate to be possible without any problems. Every user can thus produce an ejector pin of the required length for the specific application in question. The same is true of the core pin device.

The mold ancillary device according to the invention reduces the number of components for a machine tool for molding or injection-molding polymer compounds, which has a beneficial effect on price, weight and volume. In addition, the manufacturing time for producing the mold itself is reduced, since the additional installation of marker stamps can be dispensed with.

A preferred development of the mold ancillary device according to the invention is distinguished by the fact that the ejector device and/or core pin device has an adapter unit with a marker unit and a shank unit of predeterminable length, the adapter unit being fastened detachably on the shank unit.

Further embodiments and advantages of the invention result from the features described further in the claims and from the exemplary embodiments described below.

The features of the claims may be combined with one another as desired, as long as they are not obviously mutually exclusive.

BRIEF DESCRIPTION OF THE DRAWING

The invention and advantageous embodiments and developments thereof will be described and explained in more detail below, with reference to the examples depicted in the drawing. The features which emerge from the description and the drawing may be used according to the invention on their own or together in any desired combination. In the drawings.

DETAILED DESCRIPTION OF THE INVENTION

Figure 1:
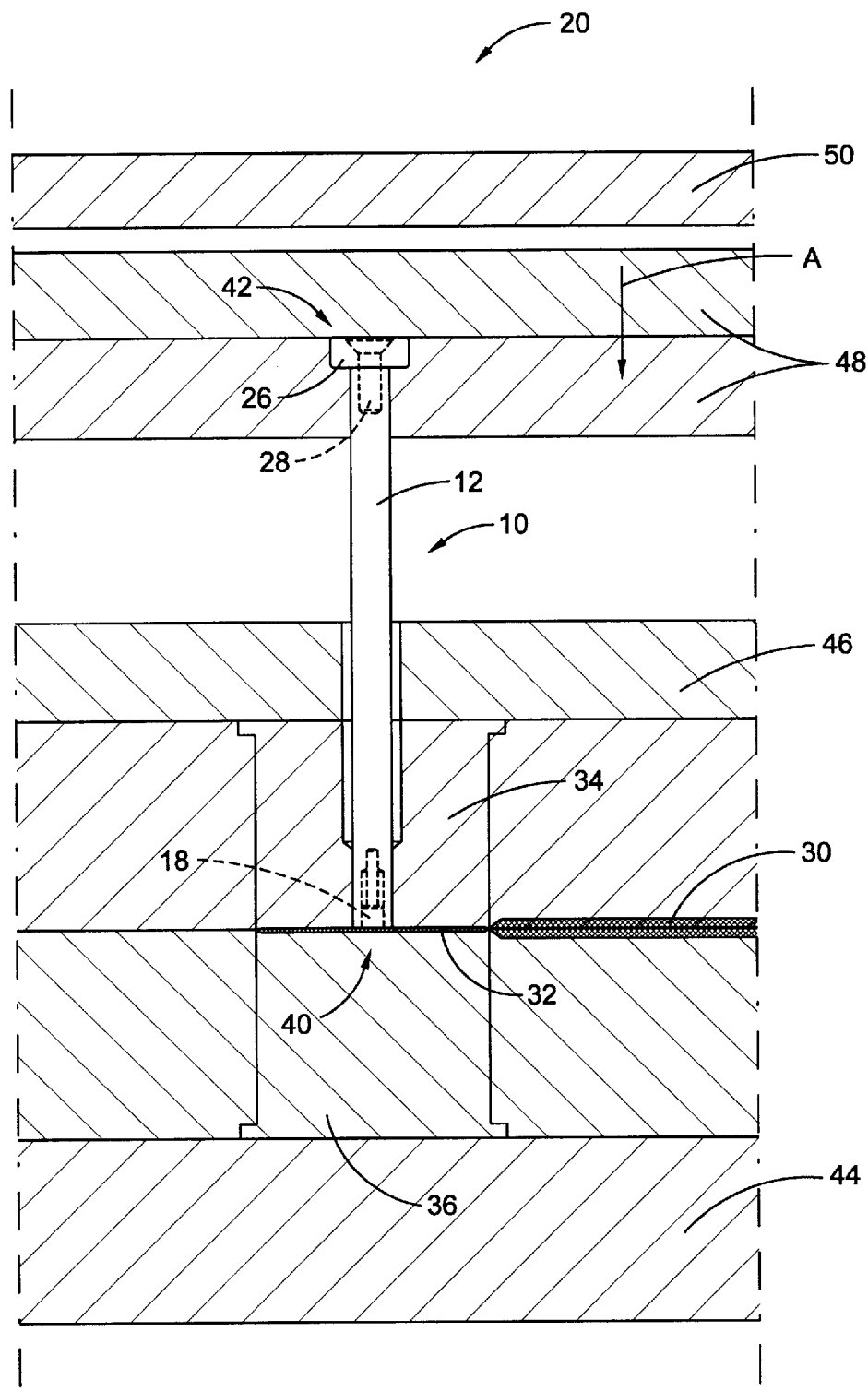
FIG. 1 shows a diagrammatic excerpt from an injection mold having an ejector device according to the invention.

The excerpt of an injection mold 20 depicted in FIG. 1 has a lower platen 44 and an upper platen 50. A lower mold insert 36 is arranged on the lower platen 44, the upper side of which insert has part of the outer contour of a molding 32 which is to be injection-molded. An upper mold insert set 34, the underside of which is in regions formed such that it forms the outer contour of the molding 32 in regions, is arranged on the lower mold insert 36. The molding 32 is injection-molded in the region between the lower mold insert and the upper mold insert 34, via a diagrammatically depicted runner 30. The sprue bush, with the remainder of the runner, is not depicted in FIG. 1.

An intermediate plate 46 is present above the upper mold insert 34. An ejector plate system 48, which is connected to an ejector rod (not shown) and can be displaced by the ejector stroke A, is arranged between the intermediate plate 46 and the upper platen 50.

An ejector pin 10, having a first, lower end region 40 and an second, opposite end region 42, is anchored in the ejector plate system 48, the shank 12 of which ejector pin is guided longitudinally displaceably in the intermediate plate 46 and the upper mold insert 34.

The lower end region 80 of the ejector pin 10 is situated in the immediate vicinity of the lower outer contour of the upper mold insert 34 and comes into contact with the injection-molded polymer compound.

The ejector pin 10 has the function of demolding the injection moldings 32 after they have been produced. After the injection molding compound has been introduced into the mold 32, the lower mold insert 36 and the upper mold insert 34 are moved apart. The injection molding 32, which then still adheres to the upper mold insert 34, is detached from the upper mold insert 34 by displacing the ejector pin 10 by the ejector stroke A by means of the displacement movement of the ejector rod (not shown).

Figure 2:
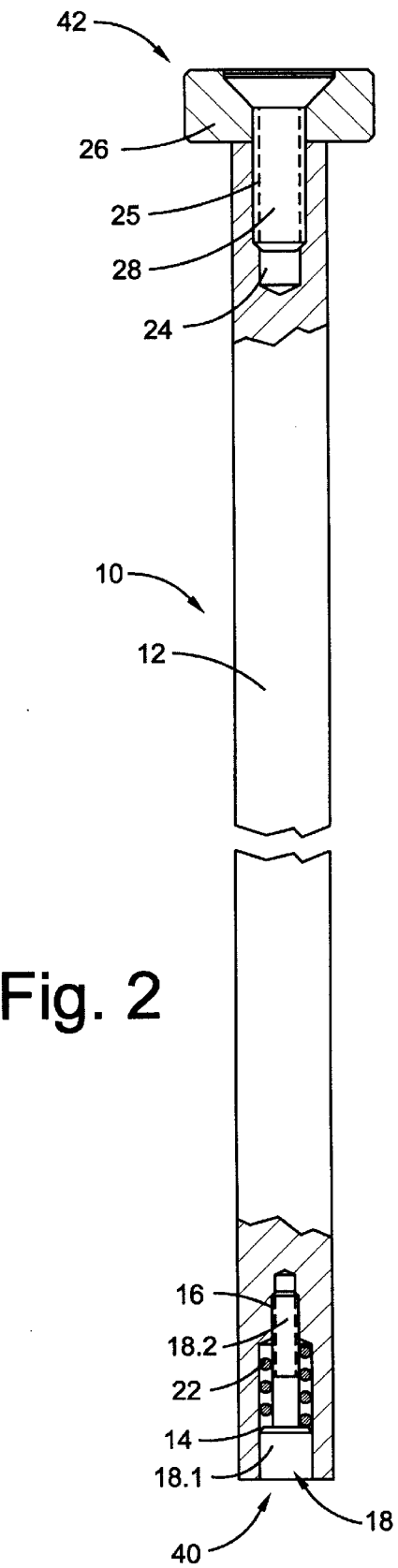
FIG. 2 shows a diagrammatically depicted ejector pin according to the invention which has been sectioned in its two end regions.

A variant according to the invention of the ejector pin 10 is depicted in more detail in FIG. 2. The ejector pin 10 has a first end region 40 which is arranged in the region of the injection molding 32. The second, opposite end region 42 is anchored in the ejector plate system 48. A stepped bore 14, which has an internal screw thread 16 in the region of the smaller diameter, is present in the first end region. A marker unit, preferably a date stamp 18 is correspondingly screwed into the stepped bore 14. The setting insert has a top region 18.1, the outer end side of which bears the data to be impressed, and a shank region 18.2. A compression spring 22, which is supported against the top region 18.1 and the step of the stepped bore 14, is arranged around regions of the shank region 18.2 in the region of the stepped bore 14, so that the top region 18.1 is supported in an elastically resilient manner.

A blind bore 24 with a screw thread 25 is present in the second end region 42 of the shank 12 of the ejector pin 10. A top plate 26, which can be fastened to the shank 12 by means of a countersunk screw 28, is arranged at the end of the second end region 42. The blind bore 24 with its screw thread 25 in this case has a greater length than the length of the screw thread of the countersunk screw 28. By selecting a sufficiently great length of the blind bore 24 with screw thread 25, it is possible for the ejector pin to be adapted to the length which is actually required in the individual case by correspondingly shortening the shank 12 in the region of the blind bore 24 in a simple manner. This makes it possible for the manufacturer of ejector pins of this kind to produce and offer an ejector pin which can be adapted to different lengths.

Figure 3:
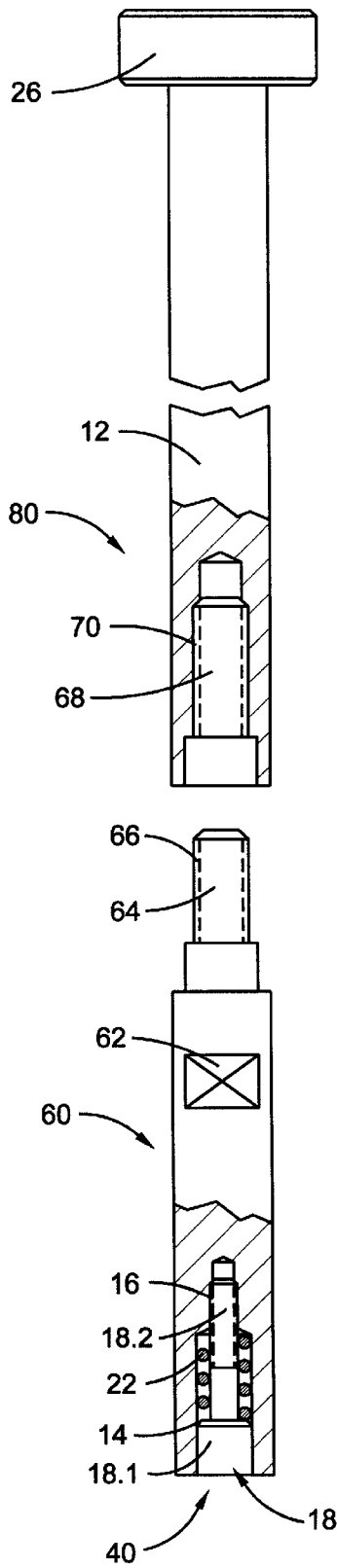
FIG. 3 shows a diagrammatically depicted ejector pin, which has been sectioned in one end region and the connection region, having an adapter unit.

The ejector pin 80 depicted diagrammatically in FIG. 3 differs from the ejector pin 10 according to FIG. 2 essentially by the fact that it has an adapter part 60 which can be detachably connected to the shank 12 and to which the setting insert (marker stamp) 18 is detachably fastened. Identical components bear identical reference numerals and are not explained again. For the purpose of connection to the shank 12, the adapter part 60 has an integrally formed screw region 64 with external screw thread 66, which can be screwed into a recess 68 with internal screw thread 70 which is present on the shank 12 correspondingly in the axial direction. For reasons of ease of handling, the adaptor part 60 has a projection 62 for the application of a spanner. This embodiment has the advantage that the adapter part as such can be produced with a uniform length and at the same time the length of the overall ejector pin 80 can be adapted to the particular mold without any problems by using different components having different shank lengths of the shank 12.

Due to the provision, according to the invention, of a marker unit on an ejector pin or core pin device, it is possible to dispense with the marker stamp which is usually designed as a separate component. This resultant reduction in the components for a mold entails considerable economic advantages with regard to costs and assembly time, while simultaneously enabling reliable marking to be ensured.

I claim:

1. A mold ejector device for a mold for molding polymer compounds, said device comprising:

an ejector pin having a first end and a second end, said first end being proximate to said mold when molding;

a marker unit disposed in said first end, said marker unit being detachably fastened to said ejector pin.

2. A device according to claim 1, wherein said marker unit is a date stamp.

3. A device according to claim 1, further comprising a top plate fastened to the second end of the ejector pin with a fastening device mated to a receiving structure, the length of the receiving structure for the fastening device being greater than the length of the fastening device.

4. A device according to claim 1, wherein the marker unit is displaceable counter to the action of an elastic spring element.

5. A device according to claim 3, wherein the fastening device is a countersunk screw and the receiving structure is a threaded blind bore.

6. A device according to claim 1, wherein the ejector pin includes an adaptor part and a shank unit of determined length, the adaptor unit being detachably fastened to the shank unit, and the marker unit being detachably fastened to said shank unit.

7. A mold for molding polymer compounds comprising a mold ejector device for molded polymer compounds, said device comprising:

an ejector pin having a first end and a second end, said first end being proximate to said mold when molding;

a marker unit disposed in said first end, said marker unit being detachably fastened to said ejector pin.

8. A mold according to claim 7, wherein the marker unit is a date stamp.

9. A mold according to claim 7, wherein the device further comprises a top plate fastened to the second end of the ejector pin with a fastening device mated to a receiving structure, the length of the receiving structure for the fastening device being greater than the length of the fastening device.

10. A mold according to claim 7, wherein the marker unit is displaceable counter to the action of an elastic spring element.

11. A mold according to claim 10, wherein the fastening device is a countersunk screw, and the receiving structure is a threaded blind bore.

12. A mold according to claim 7, wherein the ejector pin includes an adaptor part and a shank unit of predetermined length, the adaptor unit being detachably fastened to the shank unit, the marker unit being detachably fastened to said shank unit.

* * * * *